US010245556B2

(12) United States Patent
Gilron et al.

(10) Patent No.: US 10,245,556 B2
(45) Date of Patent: Apr. 2, 2019

(54) METHOD AND APPARATUS FOR EFFECTING HIGH RECOVERY DESALINATION WITH PRESSURE DRIVEN MEMBRANES

(71) Applicant: Ben Gurion University of the Negev Research and Development Authority, Beer-Sheva (IL)

(72) Inventors: Jack Gilron, Beer-Sheva (IL); Dan Peled, Kiryat Tivon (IL); Yevgeny Goldkine, Beer-Sheva (IL); Sivan Bleich, Karkur (IL)

(73) Assignees: BEN GURION UNIVERSITY OF THE NEGEV RESEARCH AND DEVELOPMENT AUTHORITY, Beer-Sheva (IL); MEKOROT WATER COMPANY LTD., Tel Aviv (IL)

( * ) Notice: Subject to any disclaimer, the term of this patent is extended or adjusted under 35 U.S.C. 154(b) by 748 days.

(21) Appl. No.: 14/394,519

(22) PCT Filed: Apr. 15, 2013

(86) PCT No.: PCT/IL2013/000040
§ 371 (c)(1),
(2) Date: Oct. 15, 2014

(87) PCT Pub. No.: WO2013/156988
PCT Pub. Date: Oct. 24, 2013

(65) Prior Publication Data
US 2015/0076063 A1    Mar. 19, 2015
US 2018/0021733 A2    Jan. 25, 2018

Related U.S. Application Data

(60) Provisional application No. 61/624,305, filed on Apr. 15, 2012.

(51) Int. Cl.
*B01D 61/12*    (2006.01)
*B01D 61/02*    (2006.01)
(Continued)

(52) U.S. Cl.
CPC .......... *B01D 65/02* (2013.01); *B01D 61/022* (2013.01); *B01D 61/12* (2013.01); *B01D 63/00* (2013.01);
(Continued)

(58) Field of Classification Search
CPC .. C02F 1/44; C02F 1/441; C02F 1/442; C02F 2303/22; C02F 1/008; C02F 2209/03;
(Continued)

(56) References Cited

U.S. PATENT DOCUMENTS 4,341,629 A    7/1982   Uhlinger et al.
4,988,445 A *  1/1991   Fulk, Jr. ............... B01D 61/022
                                              210/195.2
(Continued)

FOREIGN PATENT DOCUMENTS

CN    101053776 A    10/2007
CN    102085455 A     6/2011
(Continued)

OTHER PUBLICATIONS

Third Office Action in corresponding Chinese Patent Application No. 201380029095.3, dated Apr. 26, 2017.

*Primary Examiner* — David C Mellon
(74) *Attorney, Agent, or Firm* — Browdy and Neimark, PLLC

(57) ABSTRACT

A system and method for switching between flows of water solutions passed in groups of blocks of membrane pressure vessels arranged in parallel in a tapered flow system, wherein the system comprises a system inlet feed line, a system outlet flow line, high pressure booster pumps con-
(Continued)

figured to provide a high pressure feed stream to the system; blocks of membrane pressure vessels arrayed in parallel, and a first and second bypass line each parallel to said blocks.

4 Claims, 17 Drawing Sheets

(51) Int. Cl.
*B01D 65/08* (2006.01)
*C02F 1/44* (2006.01)
*B01D 61/00* (2006.01)
*B01D 63/00* (2006.01)
*B01D 65/02* (2006.01)
*C02F 103/08* (2006.01)
*C02F 1/00* (2006.01)

(52) U.S. Cl.
CPC ........... *B01D 65/027* (2013.01); *B01D 65/08* (2013.01); *C02F 1/44* (2013.01); *C02F 1/441* (2013.01); *C02F 1/442* (2013.01); *B01D 2313/48* (2013.01); *B01D 2317/027* (2013.01); *B01D 2317/04* (2013.01); *B01D 2321/40* (2013.01); *C02F 1/008* (2013.01); *C02F 2103/08* (2013.01); *C02F 2209/03* (2013.01); *C02F 2303/22* (2013.01)

(58) Field of Classification Search
CPC ...... B01D 65/08; B01D 61/12; B01D 65/027; B01D 61/022; B01D 2317/027; B01D 2321/02; B01D 2321/04; B01D 2321/10; B01D 2321/12; B01D 2321/14; B01D 2321/40; B01D 2317/04; B01D 2317/06; B01D 2313/105; B01D 2313/125; B01D 2313/48; B01D 61/027; B01D 61/10
See application file for complete search history.

(56) References Cited

U.S. PATENT DOCUMENTS

| | | |
|---|---|---|
| 6,120,688 A | 9/2000 | Daly et al. |
| 6,187,200 B1 | 2/2001 | Yamamura et al. |
| 2005/0067341 A1 | 3/2005 | Green et al. |
| 2007/0181473 A1 | 8/2007 | Manth et al. |
| 2008/0179250 A1 | 7/2008 | Muralidhara et al. |
| 2008/0190848 A1 | 8/2008 | Oklejas |
| 2009/0107917 A1* | 4/2009 | Capehart ............... C02F 9/00 210/638 |
| 2009/0211973 A1 | 8/2009 | Gilron |
| 2010/0270237 A1* | 10/2010 | Efraty ............... B01D 61/025 210/637 |
| 2011/0046787 A1* | 2/2011 | Booth ............... B01D 61/12 700/271 |
| 2011/0049034 A1 | 3/2011 | Theron et al. |
| 2012/0103906 A1* | 5/2012 | Efraty ............... B01D 61/022 210/652 |
| 2012/0145634 A1 | 6/2012 | Hooley et al. |
| 2012/0305459 A1* | 12/2012 | Takabatake ........ B01D 61/022 210/97 |
| 2014/0007564 A1* | 1/2014 | Efraty ............... B01D 61/002 60/327 |
| 2014/0061129 A1* | 3/2014 | Hoz ............... B01D 61/025 210/636 |
| 2018/0071683 A1* | 3/2018 | Kakigami ............ B01D 61/08 |

FOREIGN PATENT DOCUMENTS

| | | |
|---|---|---|
| EP | 1893325 A2 | 3/2008 |
| EP | 1691915 B1 | 2/2010 |
| JP | 5748303 A | 3/1982 |
| JP | 2002346348 | 12/2002 |
| WO | 2004022206 | 3/2004 |

\* cited by examiner

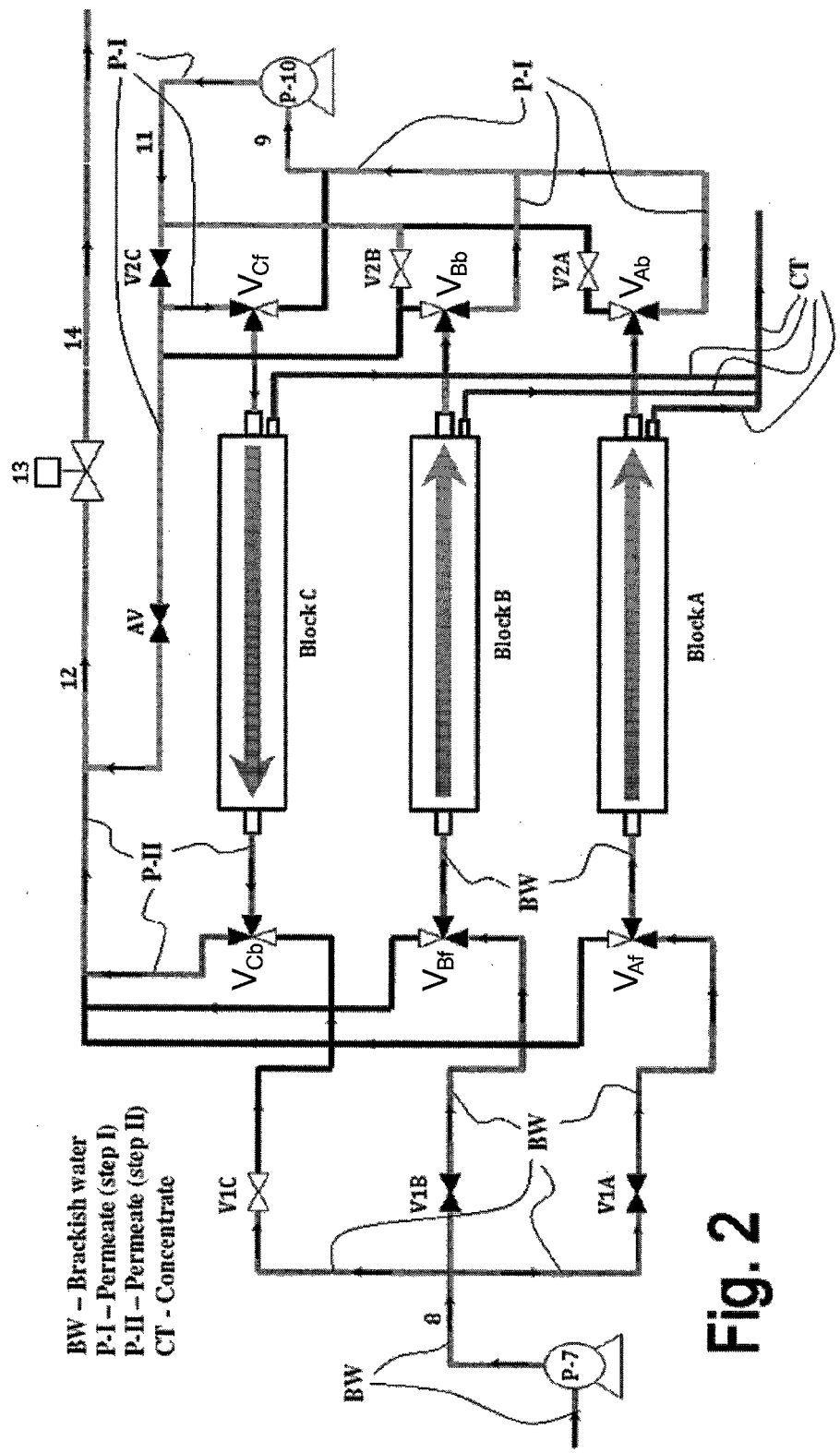
Figure 2: PRIOR ART - TAPERED FLOW REPOSITIONING FLOW SHEET AS DESCRIBED IN EMBODIMENT FOUND IN EP1893325

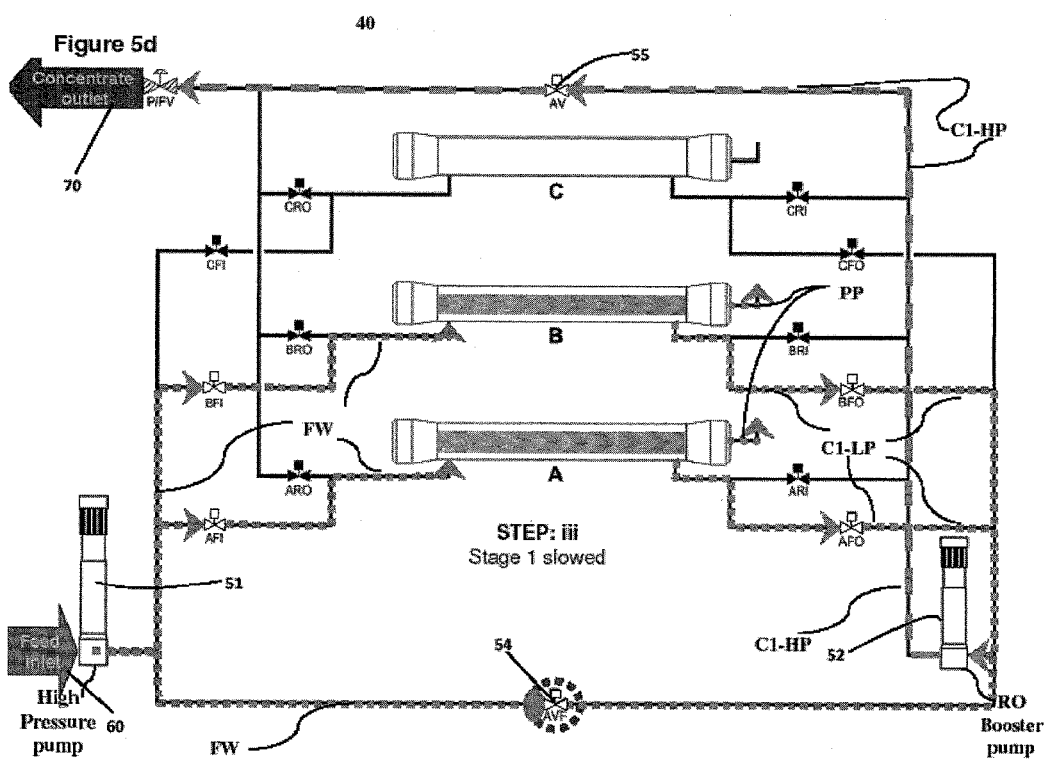

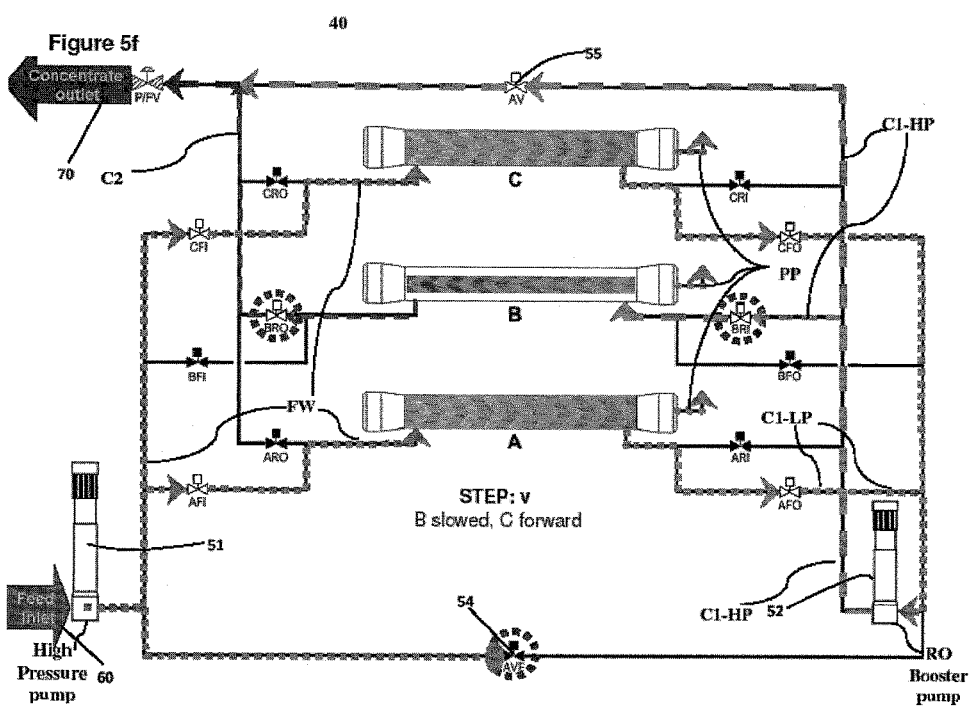

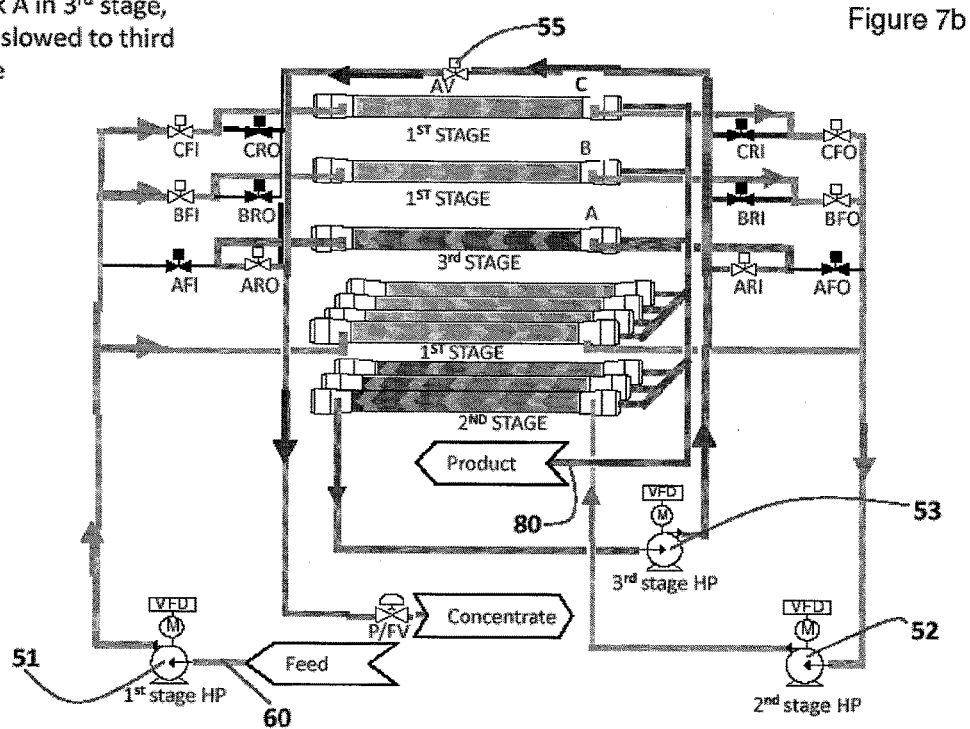

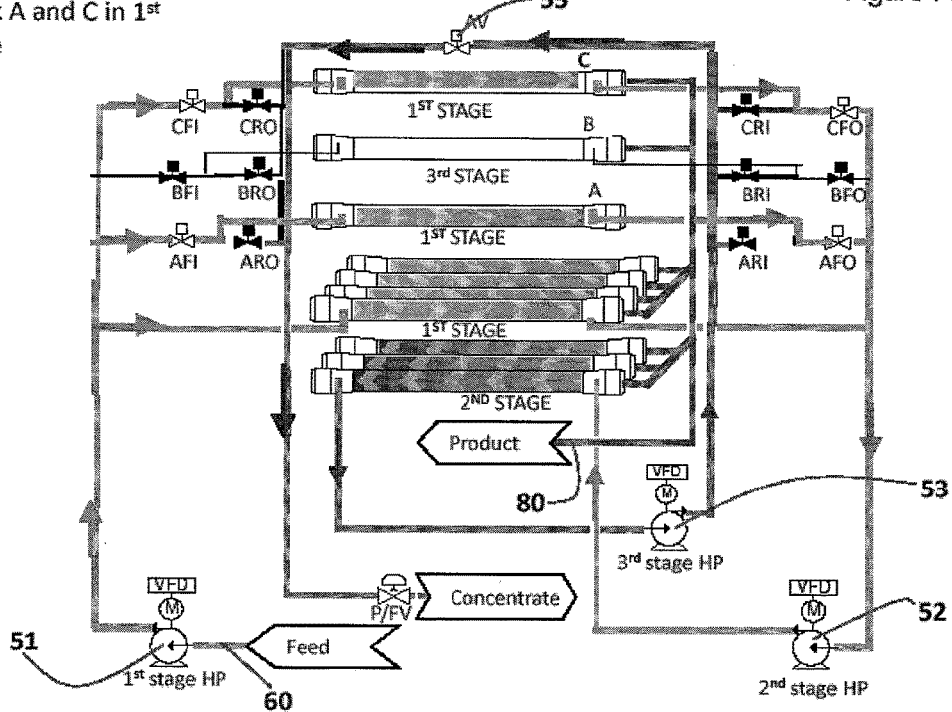

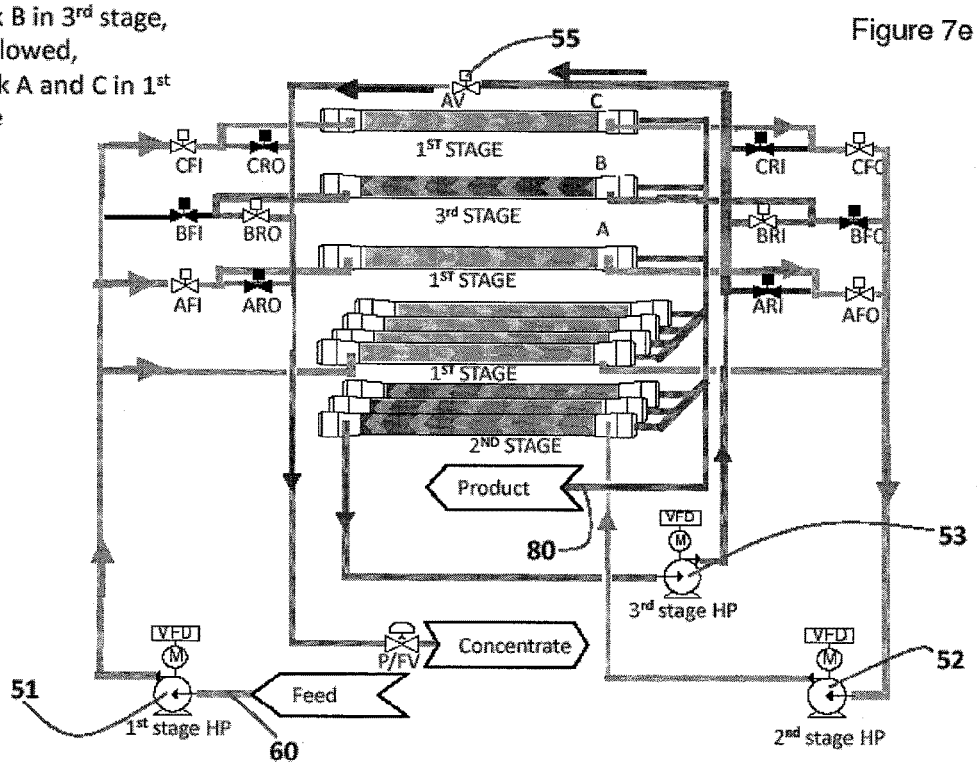

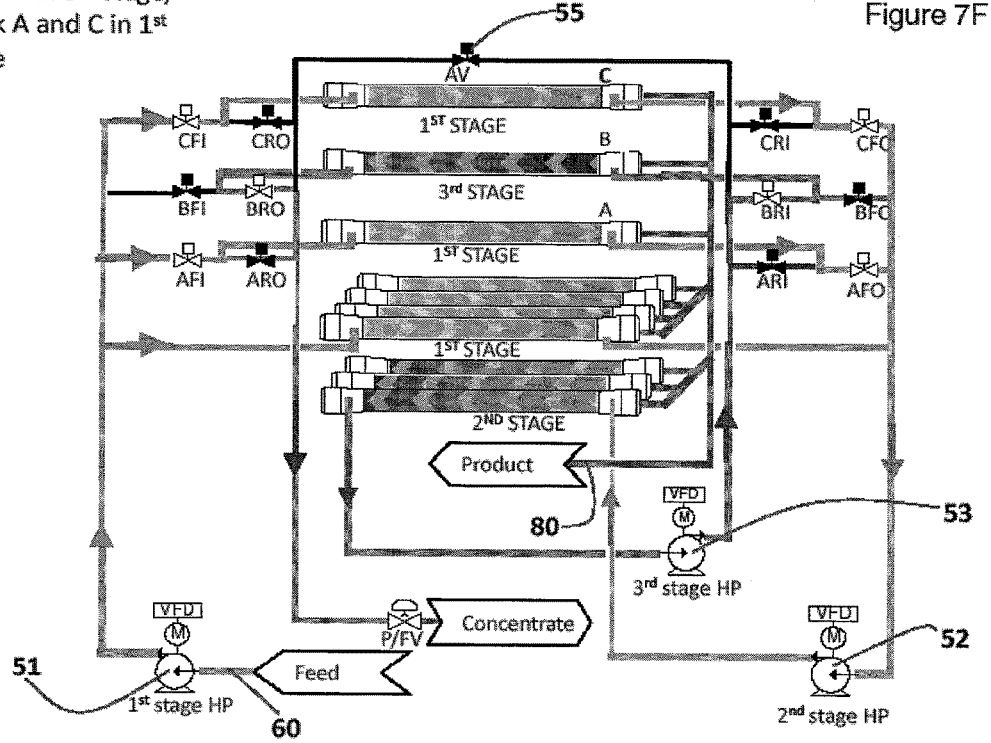

METHOD AND APPARATUS FOR EFFECTING HIGH RECOVERY DESALINATION WITH PRESSURE DRIVEN MEMBRANES

BACKGROUND

In cross-flow pressure driven membrane desalination systems, the feed stream is typically fed into a high pressure feed inlet of a pressure vessel that leads the pressurized saline solution on a flow path parallel to the membrane in the membrane element and a portion of the water passes through the membrane and exits by a low pressure connection from the same pressure vessel. The remaining saline solution with increased concentration of the retained solutes can exit from a second high pressure connection from the pressure vessel which is denoted as the concentrate port (see FIG. 1).

FIGS. 1A and 1B relate to prior art (EP1691915) The crossflow pressure vessel for pressure-driven membrane desalination showing the flow arrangement during forward flow (1A) and reverse flow (1B) in which the high pressure connections of stream Q1 and stream Q4 are switched between the left (L) side and the right (R) side of the pressure vessel, while continuing to remove the low pressure product stream (Q3) which passed through the membrane.

It has been shown (I&EC v 46, EP1691915) that in such pressure driven cross-flow desalination systems that by reversing the flow of a stream to be desalinated by switching the feed and concentrate connections to the high pressure ports of the pressure vessel, mineral scaling can be prevented by carrying this out before the induction time has been completed. This allows the use of no or little antiscalant to prevent the precipitation in the membrane elements. Furthermore it is a common practice that in high recovery pressure driven membrane desalination processes that one or more desalination membrane elements are placed in pressure vessels in stages such that more pressure vessels are in an upstream stage and that they communicate their concentrate stream to the feed ports of a fewer number of pressure vessels in the downstream stage. This is called a tapered flow arrangement of pressure vessels. This practice preserves a minimum cross-flow rate in the downstream pressure vessels that helps to prevent fouling by colloids, organics and biomaterials as well as to reduce the concentration of salts at the membrane surface. It has been revealed (European Patent Publication No. EP1893325, the entire disclosure of which is incorporated herein by reference) that by a particular use of valves arrangement, that the block of pressure vessels can be repositioned from downstream stage to an upstream stage and exchanged with block of similar number of pressure vessels from the upstream stage which are moved to the downstream stage while at the same time switching the concentrate and feed connections on the blocks of pressure vessels being repositioned. By so doing the end of the membrane element in the downstream stage that saw the highest concentration concentrate will now be exposed to the feed solution which has the lowest concentration and also the lowest concentration of sparingly soluble salts. This will allow a zeroing of the induction time as described in I&EC v46 and EP1691915, the entire disclosure of which is incorporated herein by reference.

In both flow reversal arrangements described in I&EC v46 and in the patent application concerning repositioning of the pressure vessels in the tapered flow arrangement EP1893325, all the membrane elements in the pressure vessels are periodically exposed to undersaturated solutions. On the other hand, the piping downstream of the switching valves of the second stage pressure vessels (e.g. $V_{Bf}$, $V_{Af}$ and $V_{Cb}$ in FIG. 2, when these valves are downstream of the second stage pressure vessels) always see supersaturated solutions, that may be with little or no antiscalant. Therefore while scaling is prevented on the membranes in the pressure vessel, it may not be prevented in the piping downstream of these switching valves. Such scaling is particularly a possibility downstream of the pressure maintenance devices P/FV, when these are pressure reducing valves that could cause cavitation downstream where the pressure is released, as shown in stream 14 of FIG. 2. It is a common practice to place flow, conductivity and other composition sensors on the concentrate line downstream of the pressure maintenance device and scaling of these sensors could cause them to malfunction and misreport. This in turn could interfere with the appropriate control strategy of the plant. It is a purpose of the present invention to provide a practical solution to this problem that does not require the wasting of permeate and does not interrupt the smooth operation of the desalination system with flow reversal or repositioning of pressure vessels.

In EP1893325 a particular embodiment was described for repositioning pressure vessels by the use of three-way valves (see FIG. 2, wherein BW refers to Brackish water, P-I refers to Permeate (step I), P-II refers to Permeate (step II) and CT refers to Concentrate). While this method is effective, it can be problematic because of the brief time during which those valves must switch between one port and the other port of the three-way valve. Furthermore it does not easily allow for complete isolation of one block of pressure vessels which may be desirable for maintenance or diagnostic purposes while operating the rest of the desalination unit. Furthermore, while an auxiliary bypass valve (AV) was provided for taking part of the flow from the downstream block of elements when they were being switched to an upstream stage, the particular embodiment did not describe such a bypass valve for the upstream block of elements, so that during the brief time when a fewer number of blocks of pressure vessels was being operated in an upstream stage until a new block of pressure vessels could be repositioned into that block, it would see a much larger flow that could exceed the flow allowed. At the same time when a new block of pressure vessels was repositioned into the first stage, if all of its designed flow was immediately fed to this re-positioned block, it may be subject to water hammer or other mechanical stresses that could be harmful.

SUMMARY OF INVENTION

A method and apparatus are provided for repositioning blocks of pressure vessels between one or more stages of a desalination train operating at high recovery so that mineral scaling of the membranes can be achieved with no or little use of antiscalant. This improved method solves the challenge that in re-positioning blocks of pressure vessels between a last stage and previous stage in staged desalination by pressure driven membranes there is a risk of: a) water hammer due to changing flows in each stage; and a risk of b) scaling of the concentrate line downstream of the device maintaining pressure in the feed side of the membrane elements. The present invention addresses these problems by incorporating a 2-way bypass valve across each stage and not just the last stage. In addition, the invention applies a series of valves to periodically flush with undersaturated solution the concentrate line downstream of the device maintaining pressure in the feed side of the membranes. The desalination membranes can be of the type of reverse osmosis or nanofiltration in order to retain one or more of the scaling species such as ions of calcium, carbonate, sulfate, fluoride, barium, strontium or neutral species such as silica.

In one aspect the present invention is directed to a method for repositioning membrane block(s) of pressure vessels arranged in a tapered flow structure between an upstream stage and a downstream stage, and between a downstream stage and an upstream stage, such that sudden changes of flow in the upstream stage are prevented, the method comprising: bypassing at the beginning of any membrane block(s) repositioning process in which membrane block(s) are moved out of, or into, the upstream stage, the membrane block(s) in the upstream stage, by means of a bypass stream of the feed stream; and stopping the bypass of the membrane block(s) in the upstream stage after the membrane block(s) repositioning process is completed. A particular embodiment of the method which helps prevent water hammer involves slowing the opening and closing of two-way valves on the bypass and entrance and exit ports of the membrane blocks so that there is time for pressures to equilibrate.

The invention is also directed to a method for keeping lines of concentrate in a pressure driven membrane desalination process free of scaling from a supersaturated solution of sparingly soluble minerals that is not stabilized with antiscalant, the method comprising periodically flushing the concentrate line with undersaturated solution, and concurrently streaming the concentrate through a removal line with appropriate pressure maintenance devices and concentrate monitoring sensors to allow the membrane desalination process to keep operating while the concentrate line is being flushed. The sparingly soluble minerals can be any soluble species whose activity exceeds its thermodynamic solubility in the concentrate based on the concentrate's composition, temperature and pressure.

The opening and closing of the various valves in the tapered flow arrangement may be operated by means of control means (e.g., PLC, microcontroller, personal computer—PC) adapted to determine the timing to effect the opening and closing. Optionally, the frequency of the flushing may be as high as once every hour. Alternatively the frequency of the flushing may be as low as once every time that any particular block of pressure vessels is moved to the most downstream stage of multi-stage membrane desalination process. In yet another alternative, the frequency of the flushing may be set to any time between the once every hour and every time that any particular membrane block of pressure vessels is moved into the most downstream stage.

Optionally, the desalination permeate may be used for the undersaturated solution. Alternatively, the undersaturated solution may be the treated feed supplied to the entrance of the desalination process. Advantageously, the undersaturated solution is continuously recirculated in a separate flushing loop while the membrane desalination process and concentrate line are in normal operation.

Preferably, while the concentrate line is being flushed the concentrate from the desalination process is sent to a bypass line, wherein the bypass line is part of the flushing loop during the normal operation before the flushing of the concentrate line, and wherein the bypass line comprises a pressure maintenance device which is set to maintain the pressure in the high pressure lines of the membrane desalination plant during the flushing of the concentrate line. Alternatively, when the concentrate line is being flushed, the concentrate from the desalination process may be sent out via a bypass line, without maintaining pressure in the desalination process and the flushing may be effected for a short time e.g., about 1-5 minutes. Optionally, only the concentrate line downstream of the pressure maintenance device is flushed with undersaturated solution.

In another aspect the invention is directed to a tapered flow desalination apparatus comprising: a high pressure pump configured to provide a high pressure feed stream to the apparatus, wherein the outlet of the high pressure pump is connected by means of a feed line to block(s) of membrane pressure vessels arrayed in parallel, wherein one set of high pressure ports of the block(s) of membrane pressure vessels are connected to the feed line by inlet valves, and another set of high pressure ports of the block(s) of membrane pressure vessels are connected to the inlet of an interstage booster pump by means of another set of outlet valves; and a bypass line parallel to the block(s) of membrane pressure vessels comprising a controllable bypass valve, wherein the bypass line connects between the feed high pressure pump outlet and the interstage booster pump inlet. In certain embodiments of the invention the apparatus may be implemented without the interstage booster pump, and in this case the high pressure outlet of the block(s) of membrane pressure vessels is connected by means of outlet valves directly to a manifold of second stage inlet valves leading to a second stage block(s) arrangement comprising block(s) of parallel membrane pressure vessels, and wherein the bypass valve connects between the outlet of the feed high pressure pump and the manifold of second stage inlet valves. The bypass valve may be implemented by means of a simple on-off valve. Optionally, the bypass valve may be implemented by means of a proportional valve. Preferably, the bypass valve is controlled by pneumatic actuators, or alternatively, by means of electric actuators.

The apparatus may comprise a flushing loop comprised of a flushing solution feed tank, recirculation pump, and a recycle line connecting the flushing solution feed tank and recirculation pump to form a circulation line, wherein a portion of the recycle line of this flushing loop is connected in parallel with the concentrate removal line. Preferably, the portion of the flushing loop connected in parallel to the concentrate line is equipped with a pressure maintenance device. Additionally, or alternatively, the part of the flushing loop that is connected in parallel to the concentrate line is connected to that line by means of directional control valves installed at each end of the parallel section so that flushing solution can be sent alternately through the concentrate line, and alternately recirculate in the flushing loop parallel to the return line. Advantageously, another set of directional control valves may be used to collect the flushing solution from either the concentrate line or from the flushing loop bypass line. Yet, another set of directional control valves may be utilized to send the desalination concentrate through the regular concentrate line or through the flushing loop bypass line.

In yet another aspect the present invention is directed to a method for repositioning blocks of pressure vessels arranged in a tapered flow structure between a downstream stage and an upstream stage by means of pairs of two-way valves connected in parallel, wherein the two-way valves are installed at each end of each of the blocks of pressure vessels and configured to communicate with a high pressure port on that end of the pressure vessels. The time for repositioning blocks of pressure vessels may be determined according to the induction time for sparingly soluble salts at the composition found at the exit stream of the most downstream block of pressure vessels. Optionally, the induction time may be determined by an in-situ sensor. Alternatively, the induction time may be determined by previous laboratory experiments or pilot facility experiments. Advantageously, the composition of the feed stream may be used for calculating the induction time based on an empirical correlation between composition and induction time.

The method may be implemented by an apparatus comprising a manifold of pairs of 2-way valves with each pair of valves of the said manifold attached in parallel to one high pressure port of a block of pressure vessels and a second manifold of pairs of two-way valves wherein each corresponding pair of valves in this second manifold is attached in parallel to the other high pressure port of the same block of pressure vessels, and wherein for each pair of two-way valves connected in parallel to the first high pressure port, one of the pair is connected at its other end to the high pressure feed pump outlet and the other member of the pair is connected to the pressure maintenance device, and wherein for each pair of two-way valves connected in parallel to the second high pressure port of a block of pressure vessels one of the pair is connected at its other end to the inlet of an interstage booster pump and the other member of the pair is connected at its other end to the outlet of the same interstage booster pump. The apparatus may be equipped with check valves in appropriate places to prevent flows in unintended directions.

The present invention relates to a method for repositioning membrane block(s) of pressure vessels arranged in a tapered flow structure between an upstream stage and a downstream stage, and between a downstream stage and an upstream stage comprising:
 a) bypassing the membrane block(s) in the upstream stage, at the beginning of any membrane block(s) repositioning process in which membrane block(s) are moved out of, or into, the upstream stage, by means of a bypass stream of the feed stream, and
 b) stopping the bypass of the membrane block(s) in the upstream stage after the membrane block(s) repositioning process is completed.

The present invention relates to a method for keeping lines of concentrate in a pressure driven membrane desalination process free of scaling from a supersaturated solution of sparingly soluble minerals that is not stabilized with antiscalant, comprising periodically flushing the concentrate line with undersaturated solution, and concurrently streaming the concentrate through a removal line with pressure maintenance devices and concentrate monitoring sensors to allow the membrane desalination process to keep operating while the concentrate line is being flushed.

The present invention relates to a method for repositioning blocks of pressure vessels arranged in a tapered flow structure between a downstream stage and an upstream stage by means of pairs of two-way valves connected in parallel, wherein said pairs of two-way valves are installed at each end of each of the blocks of pressure vessels and configured to communicate with a high pressure port on one end of the pressure vessels.

The present invention relates to a tapered flow desalination apparatus comprising: a high pressure pump configured to provide a high pressure feed stream to the apparatus, wherein the outlet of said high pressure pump is connected by means of a feed line to block(s) of membrane pressure vessels arrayed in parallel, wherein one set of high pressure ports of the block(s) of membrane pressure vessels are connected to the feed line by inlet valves, and another set of high pressure ports of the block(s) of membrane pressure vessels are connected to the inlet of an interstage booster pump by means of another set of outlet valves; and a bypass line parallel to said block(s) of membrane pressure vessels comprising a controllable bypass valve, wherein said bypass line connects between said feed high pressure pump outlet and said interstage booster pump inlet.

The present invention relates to a flushing loop for periodically flushing a concentrate removal line with undersaturated solution comprising a flushing solution feed tank, recirculation pump, and a recycle line connecting said flushing solution feed tank and said recirculation pump to form a circulation line, wherein a portion said recycle line is connected in parallel with said concentrate removal line.

According to a preferred embodiment, the apparatus comprises pairs of two-way valves connected in parallel, wherein said pairs of two-way valves are installed at each end of each of the blocks of pressure vessels and configured to communicate with a high pressure port on one end of the pressure vessels.

The present invention relates to a tapered flow desalination system comprising:
 a system inlet feed line coupled to a first high pressure booster pump configured to provide a high pressure feed stream to the system;
 blocks of membrane pressure vessels arrayed in parallel, wherein the outlet of said first booster pump is coupled by means of flow lines to said blocks at first opening sides of said blocks;
 a second booster pump, coupled at its inlet by a first bypass line parallel to said blocks, to said first booster pump outlet, wherein said second booster pump outlet and inlet are also coupled by means of flow lines to said blocks at second opening sides of said blocks and wherein said first bypass line is also coupled by means of flow lines to said blocks at said second opening sides of said blocks;
 a system outlet flow line coupled to said first opening sides of said blocks, coupled to said second opening sides of said blocks and to the second booster pump outlet, wherein said system outlet flow line is coupled to said second opening sides of said blocks and to said second booster pump outlet by means of a second bypass line (which is also actually parallel to said blocks);
 wherein the first bypass line comprises a valve and wherein the second bypass line comprises a valve;
 wherein at least two of the lines coupling between said first booster pump outlet and said first opening sides of said blocks each comprise a valve;
 wherein at least two of the lines coupling between said second booster pump outlet and said second opening sides of said blocks each comprise a valve;
 wherein at least two of the lines coupling between said second opening sides of said blocks and said second booster pump inlet each comprise a valve; and
 wherein at least two of the lines coupling between said first opening sides of said blocks and said system outlet flow line each comprise a valve.

Preferably, said system comprises three blocks, and wherein the lines coupling between said first booster pump and said first opening sides of said blocks each comprise a valve;
 wherein the lines coupling between said second booster pump and said second opening sides of said blocks each comprise a valve;
 wherein the lines coupling between said second opening sides of said blocks and said first bypass line each comprise a valve; and
 wherein the lines coupling between said first opening sides of said blocks and said system outlet flow line each comprise a valve.

Preferably, the system comprises one or more control elements selected from the group of additional valves, check valves and sensors.

Preferably, each pressure vessel block is coupled to a permeate product line.

The present invention relates to a method for switching between flows of water solutions passed in groups of blocks of membrane pressure vessels arranged in parallel in a tapered flow system, wherein said method comprising the steps of:
- A) passing feed water solution through one or more of said system blocks in a first stage and the concentrated water solution exiting said blocks of the first stage is passed through one or more of the system blocks in a second stage and the concentrated water solution exiting the blocks of the second stage is passed through a system concentrate outlet;
- B) slowing the stream(s) passed in said second stage by bypassing a portion of the concentrated water solution exiting the blocks of the first stage to the system concentrate outlet;
- C) stopping the slowed stream(s) of a first group of blocks being of one or more of the blocks of the second stage;
- D) slowing the stream(s) passed in the first stage by bypassing a portion of said feed water solution, to the system concentrate outlet;
- E) stopping the slowed stream(s) of a second group of blocks being of one or more of the blocks of the first stage, wherein said second group of blocks comprise the same number of blocks as in said first group of blocks; and passing a portion of the feed water solution through said first group of blocks;
- F) stopping the bypassing of step D and passing a portion of the concentrated water solution exiting the blocks of the first stage through said second group of bocks;
- G) stopping the bypassing of step B.

Preferably, the number of blocks in the first group of blocks is 1.

The present invention relates to a tapered flow desalination system comprising:
a system inlet feed line coupled to a first high pressure booster pump configured to provide a high pressure feed stream to the system;
a first group of blocks of membrane pressure vessels arrayed in parallel, wherein the outlet of said first booster pump is coupled by means of flow lines to said first group of blocks at first opening sides of said first group of blocks;
a second booster pump, coupled at its inlet by means of flow lines to said first group of blocks at second opening sides of the first group of blocks; and coupled at its outlet to a second group of blocks of membrane pressure vessels arrayed in parallel at first opening sides of the second group of blocks;
a third booster pump, coupled by means of flow lines to said second group of blocks at second opening sides of the second group of blocks; and coupled by means of flow lines to said first group of blocks at said second opening sides of said first group of blocks;
a system outlet flow line coupled by flow lines to said first opening sides of said first group of blocks, coupled to said second opening sides of said first group of blocks and to the third booster pump, wherein said system outlet flow line is coupled to said second opening sides of said first group of blocks and to said third booster pump by means of a bypass line;
wherein the bypass line comprises a valve;
wherein at least two of the lines coupling between said first booster pump and said first opening sides of said first group of blocks each comprise a valve;
wherein at least two of the lines coupling between said second booster pump and said second opening sides of said first group of blocks each comprise a valve;
wherein at least two of the lines coupling between said third booster pump and said second opening sides of said first group of blocks each comprise a valve;
wherein at least two of the lines coupling between said first opening sides of said first group of blocks and said system outlet flow line each comprise a valve.

Preferably, the first group of blocks comprise at least 4 blocks and the second group of blocks comprise, at most, two less blocks than the first group.

Preferably, the system comprises one or more of the control elements selected from the group of additional valves, check valves and sensors.

Preferably, each pressure vessel block is coupled to a permeate product line.

The present invention relates to a method for switching between flows of water solutions passed in groups of blocks of membrane pressure vessels arranged in parallel in a tapered flow system, wherein said method comprising the steps of:
- A) passing feed water solution through one or more of said system blocks in a first stage and the concentrated water solution exiting said blocks of the first stage is passed through one or more blocks in a second stage and the concentrated water solution exiting the blocks of the second stage is passed through one or more blocks in a third stage and the concentrated water solution exiting the blocks of the third stage is passed through a system concentrate outlet;
- B) slowing the stream(s) passed in said third stage by bypassing a portion of the concentrated water solution exiting the blocks of the second stage to the system concentrated outlet;
- C) stopping the slowed stream(s) of a first group of blocks being of one or more of the blocks of the third stage;
- D) stopping the stream(s) of a second group of blocks being of one or more of the blocks of the first stage, wherein said second group of blocks comprise the same number of blocks as in said first group of blocks; and passing a portion of the feed water solution through said first group of blocks;
- E) passing a portion of the concentrated water solution exiting the blocks of the second stage through said second group of blocks;
- F) stopping the bypassing of step B.

Preferably, the initial number of blocks in the third stage is at most, one less than, the number of blocks in the second stage and the number of blocks in the second stage is at most, one less than the number of blocks in the first stage.

The present invention relates to a flushing loop system for periodically flushing a concentrate removal line with undersaturated solution comprising:
a flushing undersaturated solution feed tank coupled to a recycle line ending back at said feed tank;
wherein said recycle line comprises a recirculation pump configured to drive said undersaturated solution from said feed tank and back to said feed tank;
wherein a portion said recycle line is connected in parallel with said concentrate removal line.

The present invention relates to a flushing loop system for periodically flushing a concentrate removal line with undersaturated solution comprising:

a flushing undersaturated solution feed tank coupled to a recirculation pump by a flow line;

wherein a first portion of the concentrate removal line is coupled to a third portion of the concentrate removal line by two parallel flow lines, one being a second portion of the concentrate removal line and the other being a flush removal line;

wherein said recirculation pump is coupled to the second portion of the concentrate removal line by two parallel flow lines; and wherein said feed tank is coupled to the second portion of the concentrate removal line by two parallel flow lines;

Preferably, the recirculation pump is coupled to a first three-way valve by a flow line;

wherein said first three way valve is coupled to a second three way valve by a flow line and to the second portion of the concentrate removal line by a flow line;

wherein said second three way valve is also coupled to said second portion of the concentrate removal line;

wherein said second portion of the concentrate removal line is also coupled to a third three way valve and to a fourth three way valve; wherein said third three way valve is also coupled to said fourth three way valve by a flow line;

wherein said flushing removal line is coupled to said first three way valve, said second three way valve, said third three way valve and said fourth three way valve;

wherein said fourth three way valve is coupled to the feed tank;

wherein said third three way valve is coupled to the first portion of the concentrate removal line;

wherein the second three way valve is coupled to the system third portion of the concentrate removal line; and wherein said portion of the concentrate removal line and said flushing removal line each comprise a two way valve.

The present invention relates to a method for flushing a portion of a concentrate removal line, comprising:

A) passing a concentrated solution through a portion of a concentrate removal line;

B) redirecting the concentrated solution and passing it through a flow line parallel to said portion of the concentrate removal line; and passing a flow of undersaturated solution through said portion of the concentrate removal line;

C) stopping the passing of the undersaturated solution; and redirecting the concentrated solution and passing it back through said portion of the concentrate removal line;

D) periodically repeating steps B-C.

Preferably, step A further comprises passing an undersaturated solution through the flow line parallel to the portion of the concentrate removal line;

and wherein step B further comprises redirecting the undersaturated flow of step A and passing it through the portion of the concentrate removal line;

and wherein step C further comprises redirecting the undersaturated flow of step B and passing it back to the flow line parallel to the portion of the concentrate removal line.

The present invention relates to a system wherein the first portion of the aforementioned concentrate removal line is the aforementioned system outlet flow line.

According to another embodiment of the present invention, all the system embodiments as disclosed herein do not necessarily need to have a second booster pump (or third booster pump), such as when the streams have adequate pressure provided by the first pressure pump (at the inlet feed line) of the system invention.

BRIEF DESCRIPTION OF THE DRAWINGS

The present invention is illustrated by way of example in the accompanying drawings, in which similar references consistently indicate similar elements and in which:

FIGS. 1A-1B and 2 illustrate prior art inventions.

FIGS. 4, 5A-5G illustrate the two stage with A VF bypass line embodiment of the present invention.

FIGS. 7A-7F illustrate the three stage embodiment of the present invention.

DETAILED DESCRIPTION OF THE INVENTION

One of the objects of the present invention is to provide technological solutions to several possible operational problems that may arise in the practice of EP1691915 and repositioning of pressure valves as taught in EP1893325, by means of a novel valve arrangement. In particular, the apparatus of the present invention is designed to prevent scaling in the lines of the downstream of the positioning valves downstream of the pressure vessels in the last stage that always see supersaturated concentrate. The present invention further provides an improved design for preventing water hammer effects or other hydraulic shock to membrane elements in the pressure vessels in the upstream stage when repositioning blocks of pressure vessels into and out of this stage. In both cases a novel valve arrangement is used in ways that would not be anticipated or practiced by those versed in the art of membrane systems.

The novel valve arrangement of the invention on the concentrate line allows flushing of the concentrate line only without losing time to production while the flushing solution flushes the whole membrane train. In the past, it has been the practice of some operators of membrane desalination plants to periodically (e.g. once every day) flush their lines with feed water or saline water (see Liberman et al.), but this involves cessation of the membrane operation and loss of production. In the case of Liberman et al. it also involves the use of saline solutions that carry both a chemical expense and an environmental penalty because of the need to dispose of these hypersaline solutions.

Figure 6:
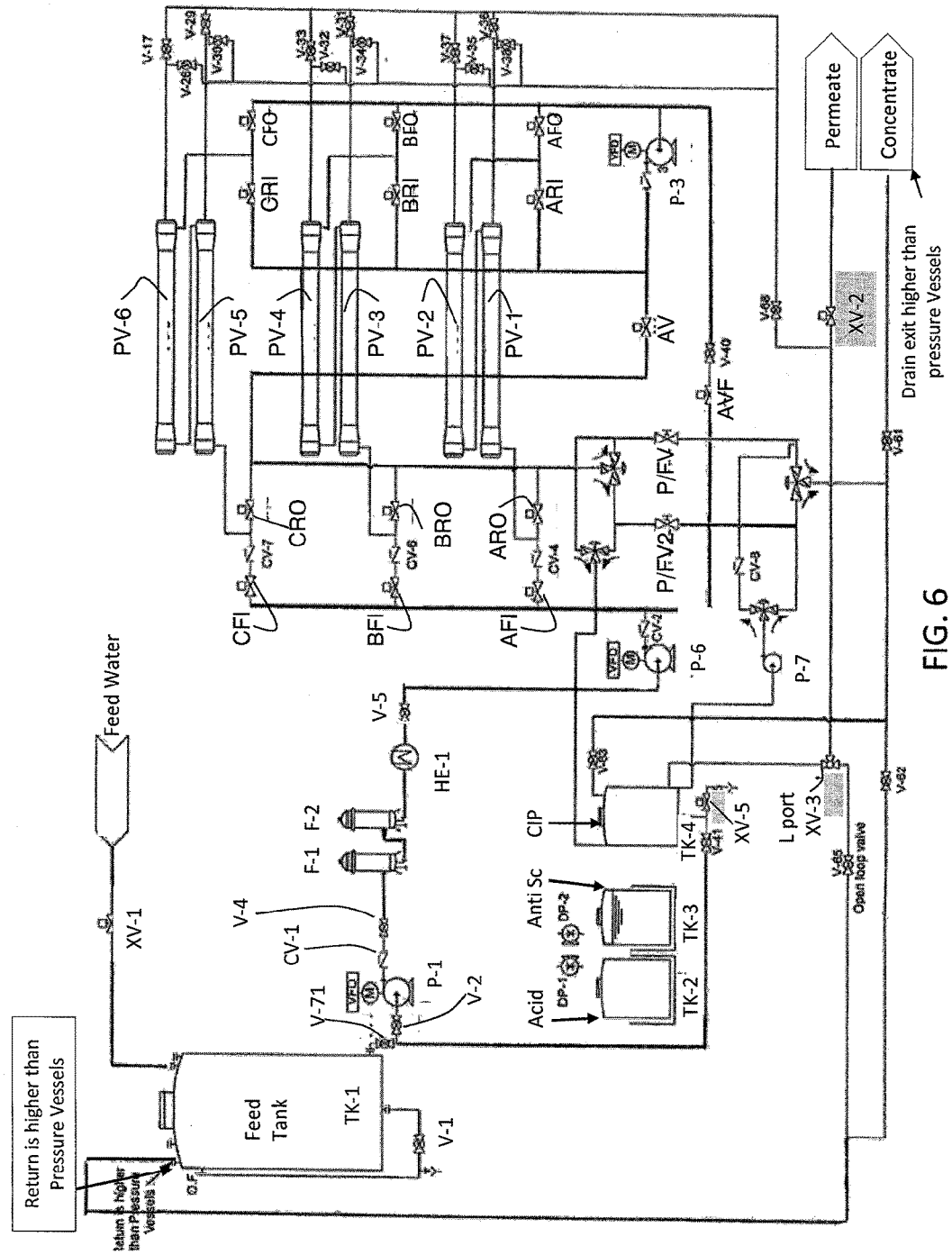
FIG. 6 illustrates an example of a general overview of an embodiment of the present invention.

FIG. 6 shows a general flowsheet of the tapered flow desalination apparatus according to an embodiment of the invention. The apparatus illustrated in FIG. 3 (an expansion of a portion of the apparatus of FIG. 6) exemplifies one preferred embodiment of the invention and a method for carrying it out. The concentrate stream [4] can be directed by one or more valves (here XV-4 and XV-5) between a flushing solution recycle line (FRL) and the concentrate removal line (CRL). Both the CRL and FRL are equipped with devices (in this embodiment back pressure valves P/FV and P/FV2 respectively) to maintain the pressure in the feed/concentrate side of the membrane elements. However the pressure maintenance devices could also be pressure exchangers or other energy recovery devices. During normal operation (indicated by reference numerals 3$n$), the concentrate stream [4] flows through the concentrate removal line (CRL) sent out of the system while a stream of flushing solution [5] is recycled between the CIP tank and the FRL through valves XV-6 and XV-7 while P/FV2 is completely open. Periodically (for example, as frequently as once every hour up to as infrequently as the same time period as used for flow reversal or for repositioning pressure vessels between the stages to prevent scaling) the valves XV-4 and XV-5 (in this particular embodiment 3-way valves but it could be a manifold of two-way valves or slide valves) valve positions are switched to direct the concentrate stream [4] as indicated by the arrows referenced by numerals 3p so that the concentrate stream [4] is sent through the FRL, and the position of valves XV-6 and XV-7 are also switched such that the flushing solution [5] flowing in the direction of the arrows referenced by numerals 3r is sent through the CRL before returning to the CIP tank (TK-1). In this way, all the surfaces of the CRL that were exposed to supersaturated concentrate are now exposed to undersaturated flushing solution. At the same time the back pressure device P/FV is completely opened and the back pressure device P/FV2 is set to the same setting as previously held by the P/FV to maintain the same back pressure in the feed lines of the pressure vessels. In this case a limited volume of flushing solution which can be feed water or permeate is held in a tank such as a clean-in-place (CIP TK-1) tank and it is re-used over and over for periodically flushing the concentrate line. This can continue to be the case until the residual concentration of scaling ions in the flushing solution reaches their saturation limit and a new batch of flushing solution may be then introduced.

According to an embodiment of the invention, the time during which the CRL is flushed (stream [5] going in the direction of arrows 3r) can be as short as one minute or twice the hydraulic residence time in the CRL, whichever is shorter, and as long as the time that a particular block is positioned in the downstream stage or that one direction of a flow reversal cycle is being operated. Once the flushing is complete, the valve positions are returned to their original position (3n).

Some of the advantages of this approach are: the system never stops operating and producing permeate while the concentrate line is flushed; a limited amount of volume is repeatedly used (volume of the CIP tank TK-1) and therefore little permeate is wasted; and any sensors on line CRL are kept free of scaling so they will operate properly.

Other embodiments for flushing the CRL concentrate line involve briefly (for a time as little as two hydraulic residence times of the normal concentrate stream) sending all of the permeate to a point downstream of P/FV which may be used for simplicity but does involve wasting a certain amount of permeate, but does allow keeping sensors on CRL to be maintained scale-free. Another embodiment involves bypassing the 2nd stage and lowering recovery—opening P/FV (+ adding acid/AS) temporarily to get concentrate conditions to undersaturated conditions. This has the advantage of rinsing the P/FV without a separate line while maintaining production from the first stage. It has the disadvantage of losing production from the second stage. However if the time is short this may not be too bad a disadvantage.

Figure 4:
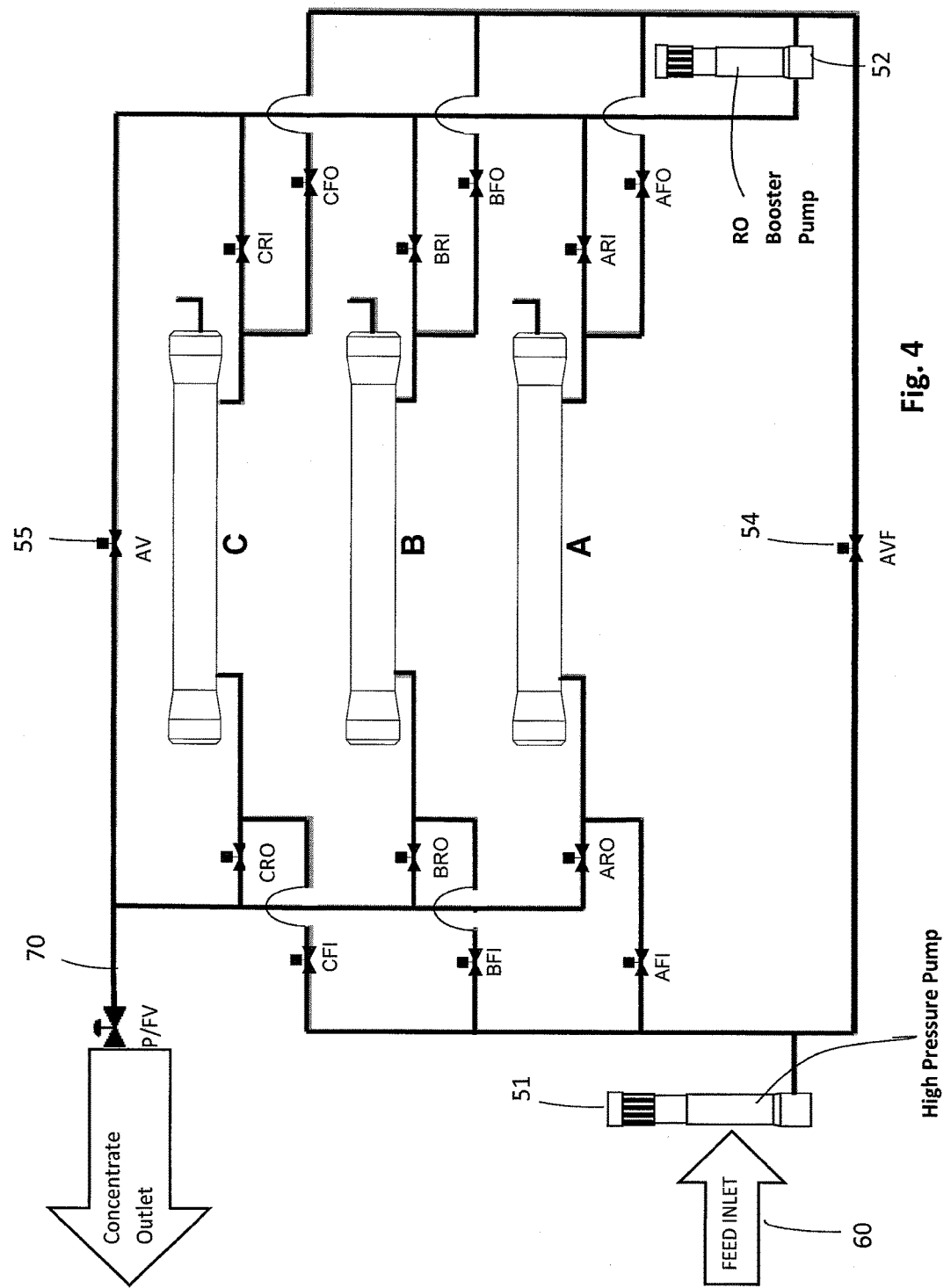

The present invention further provides a two-way valve arrangement for effecting repositioning of pressure vessels between the stages of a membrane desalination plant, wherein the valve arrangement employs a bypass valve on the first stage to prevent sudden changes in hydraulic flows on pressure vessels in the first stage. One preferred embodiment of this solution of the invention is shown in FIG. 4. In this embodiment, the apparatus 40 the pairs of 2-way valves (AFI/ARO, BFI/BRO, CFI/CRO) have replaced the two-way upstream valves $V_{1A}$, $V_{1B}$, $V_{1C}$, and three-way valves $V_{Af}$, $V_{Bf}$ and $V_{Cb}$, shown in FIG. 2, and the pairs of two-way valves (ARI/AFO, BRI/BFO, CRI/CFO) have replaced two-way valves $V_{2A}$, $V_{2B}$, $V_{2C}$, and three-way valves $V_{Ab}$, $V_{Bb}$ and $V_{Cf}$ shown in FIG. 2. In addition, an additional bypass valve AVF has been added to link the outlet of the high pressure pump to the inlet of the interstage booster pump to take the excess flow from the high pressure feed pump when only one block of pressure vessels is operative in the first stage, and to reduce the initial flow on re-introducing a block of pressure vessels into the first stage after repositioning. A particular embodiment can include partially opening the proportional back pressure valve P/FV when the flow rate increases as a result of using the bypass AV and/or AVF. By doing this, an increase in pressure can be prevented from the increase in flow to the P/FV when feed flows through the second stage and/or first stage bypass line.

According to an embodiment of the present invention, the tapered flow desalination system and method are as follows. The system comprises two stages in which the concentrate exiting the first stage becomes the feed entering the second stage. The system comprises I membrane block pressure vessels having feed water pass through them during the first stage and J membrane block pressure vessels having feed (concentrate exiting the I first stage blocks) pass through them during the second stage, wherein preferably I>J. A feed high pressure pump is connected to the flow line at a portion of the line wherein the incoming inlet feed flows through a single line before being split into the lines of the blocks into the next stage.

An interstage booster pump is connected between the blocks of both stages. The flow direction in block(s) of the second stage can be reversed and become part of the first stage and the flow direction in block(s) of the first stage can be reversed and become part of the second stage.

Additional elements (e.g. valves or control elements such as check valves or sensors) are connected to the system. Each pressure vessel is coupled to a permeate product line wherein the permeate filtered exits the pressure vessel through it. The permeate product lines coming out of the pressure vessels are coupled to one main system outlet permeate product line.

According to an embodiment, an AV bypass line (with an AV valve) couples between the concentrate outlet of the system and the second stage booster pump. The bypass line AVF line (with the AVF valve) couples between the first stage booster pump and the second stage booster pump.

FIG. 4 shows an embodiment with two vessel blocks in the first stage (A and B), and one vessel block (C) in the second stage. The first booster pump is connected to the system incoming feed inlet line 60.

The blocks of pressure vessels A, B, and C have been connected to the flow manifold so that they can either operate in parallel and as part of stage one (the bottom stage) or as part of stage two (the top stage). When the valves connected to a block and labeled with the symbol FI and FO are open (open symbols) then that block is parallel to and part of the first stage. When the valves connect to a block and labeled with the symbols RI and RO are open (open symbols) then that block is part of the second stage.

The valves AFI, BFI and CFI are each coupled by flow lines to the first booster pump 51, to the valves ARO, BRO and CRO respectively, to the inlets/outlets of blocks A, B and C respectively, to the AVF valve 54 and to one another.

The valves ARO, BRO and CRO are also coupled to the inlets/outlets of each of the blocks A, B and C respectively, to the AV valve 55, to the system outlet concentrate outlet line 70 (of the system) and to one another.

The valves AFO, BFO and CFO are each coupled by flow lines to the second booster pump 52, to the valves ARI, BRI and CRI respectively, to the inlets/outlets of blocks A, B and C respectively, to the AVF valve 54 and to one another.

The valves ARI, BRI and CRI are also coupled to the inlets/outlets of blocks A, B and C respectively, to the second booster pump 52, to the AV valve 55 and to one another.

The first booster pump 51 is also coupled to the AVF valve 54.

The second booster pump 52 is also coupled to the AV valve 55 and to the AVF valve 54.

Figure 1A:
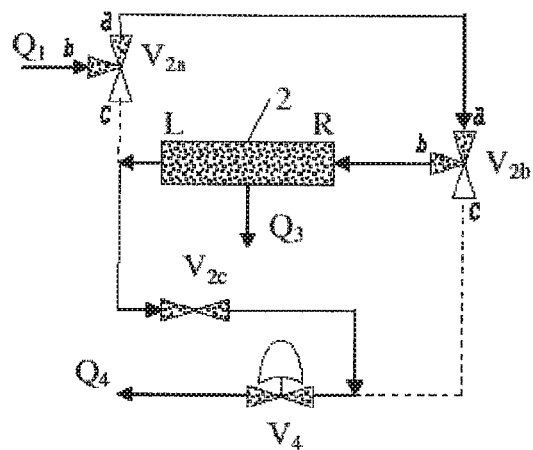
Figure 1B:
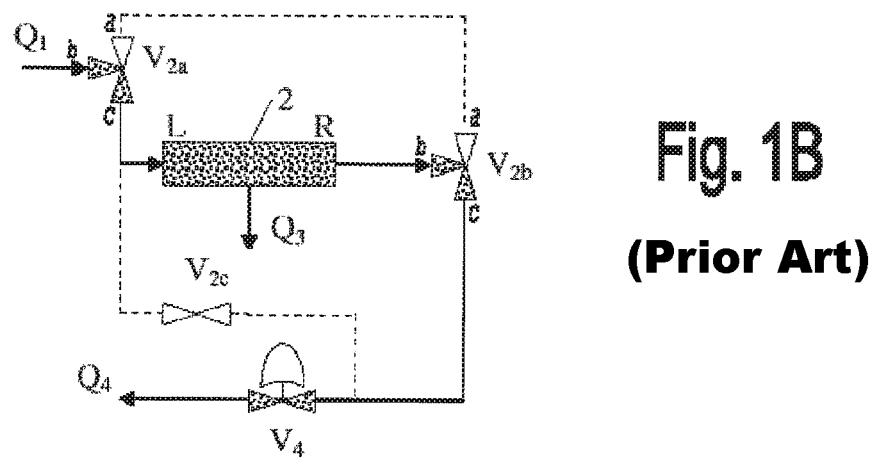
Figure 3:
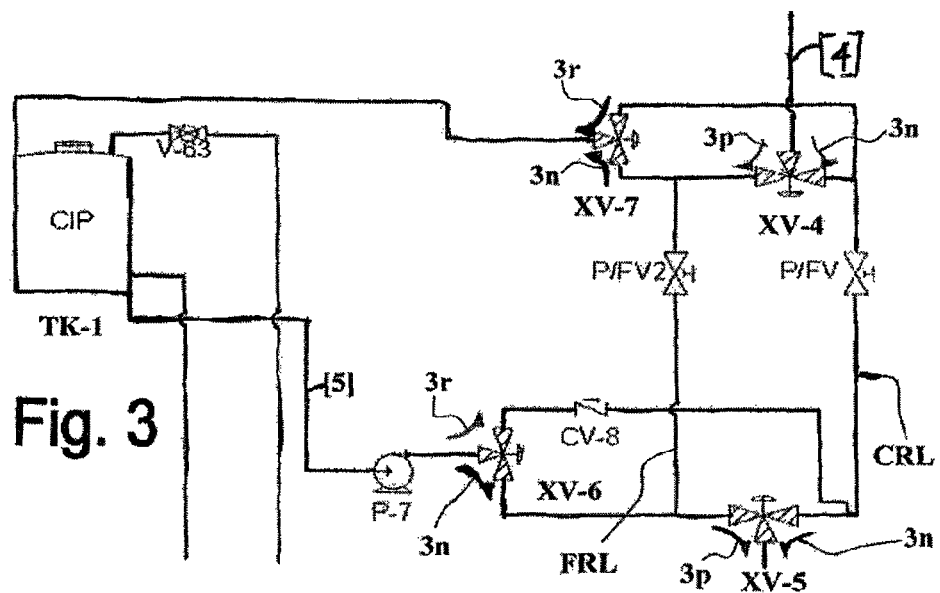
FIG. 3 illustrates the flushing of the concentrate line embodiment of the present invention.

The AV valve 55 is also coupled to the concentrate outlet line 70 of the system (which according to an embodiment is line [4] of FIG. 3).

A particular method for operating apparatus 40 is illustrated in FIGS. 5A to 5G comprising the same structure as in FIG. 4. Though not shown in the figures, check valves may be installed on each of the lines to prevent short-circuiting and bypassing during the transition process. Dotted lines refer to lines in which feed solution is flowing between the feed high pressure pump and the interstage booster pump. Dashed lines refer to lines in which interstage concentrate or final concentrate is flowing between the interstage booster pump and the back pressure valve or device (P/FV) and onward to the concentrate outlet line. Thin lines refer to process lines in which no flow is occurring. Apparatus 40 comprises pairs of 2-way valves on each high pressure port of the pressure vessels to effect repositioning of membrane blocks A B and C of pressure vessels between a first and second membrane stages. The sequence to effect this change is illustrated in FIGS. 5A to 5G. Table 1 summarizes a sequence of steps needed to reposition block C from the second stage to the first stage, and block B from the first stage to the second stage. In particular, this highlights the role of the bypass valve AVF in the first stage.

In yet another preferred embodiment of the invention, the apparatus is configured to switch blocks by placing all three blocks in the first stage to slow the flow rate to each one in preparation for switching. Then one of the block's valving is changed so that it is moved into the second stage.

In yet another preferred embodiment of the invention, the apparatus is configured to switch one of the two blocks in the first stage with the block of the second stage, slowing the flow rate to each one in preparation for switching. The steps performed in this embodiment are demonstrated in table 2. This embodiment has the advantage of eliminating the need for the first stage bypass valve, AVF. On the other hand it could lead to too high recovery being obtained in the first stage unless applied feed pressures are adjusted during the transition.

In both embodiments (with AFV and without), there is an advantage to increasing the time to effect the opening and closing of the two-way valves to between 5 and 30 seconds (and preferably between 5 and 15 seconds) in order to reduce the increase in pressure even further.

In the method, as explained in FIGS. 5A-5G, the initial working mode (FIG. 5A) is wherein at a first stage incoming feed water is passed through blocks A, B. The concentrated liquid coming out of those four blocks is passed in the second stage though block C, and from there out of the system. The method comprises switching the roles between block B and block C. After the switching, block C is connected to the feed line 60 (at its opposite side), and block B becomes the second stage vessel block. This is done by opening/closing the appropriate valves. The working modes are switched periodically.

Figure 5A:
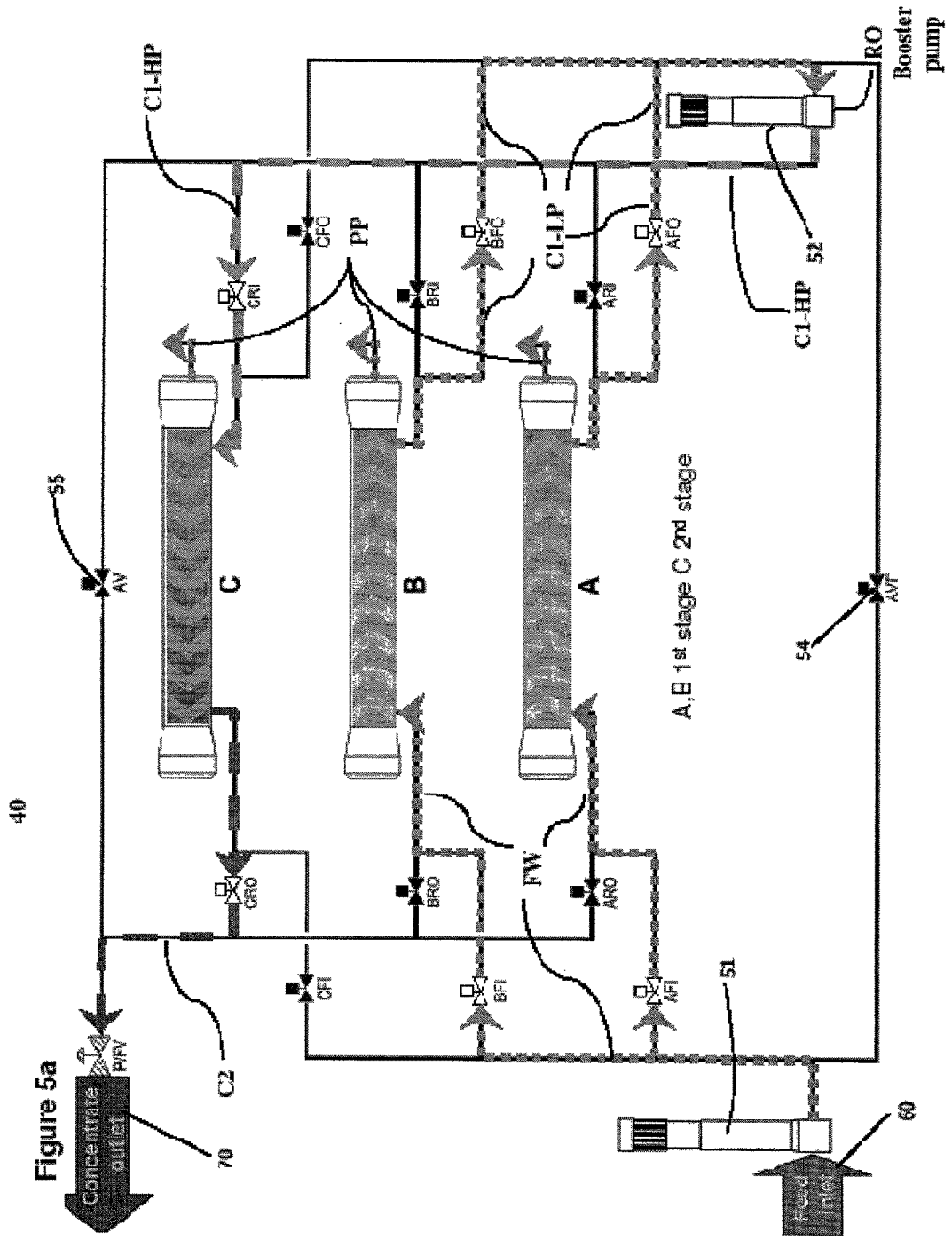
Figure 5B:
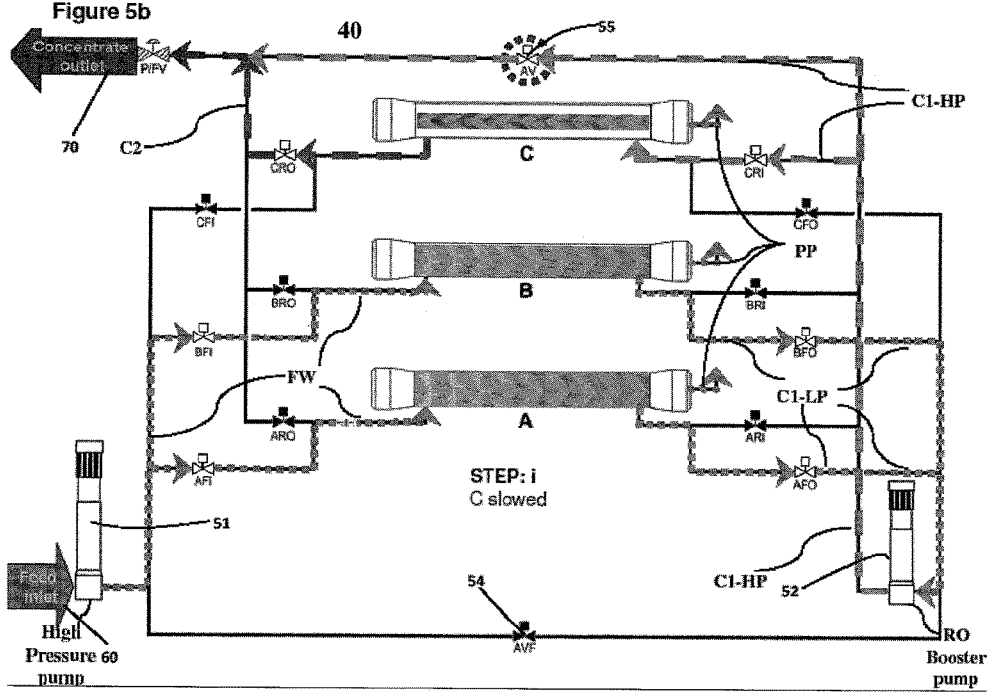
Figure 5C:
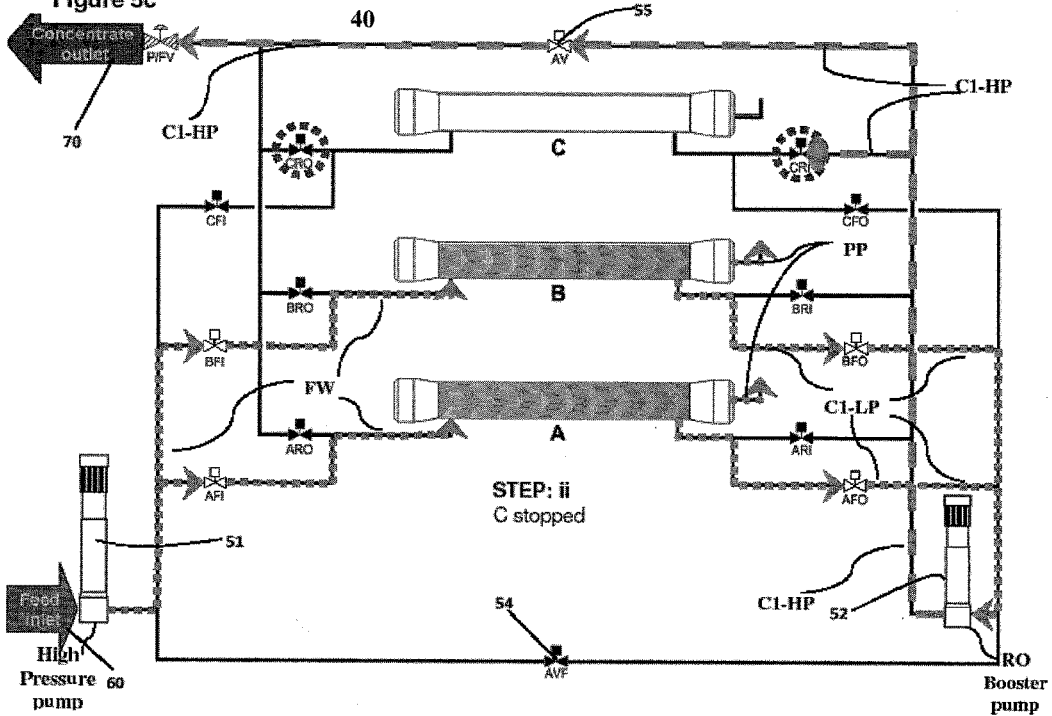
Figure 5E:
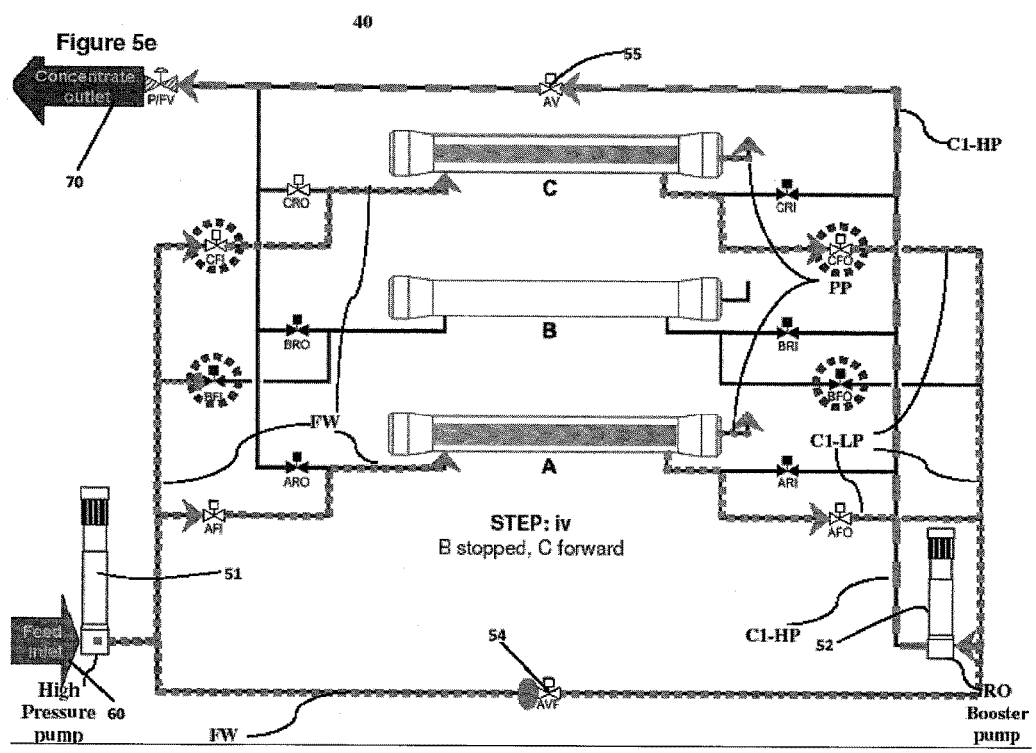
Figure 5G:
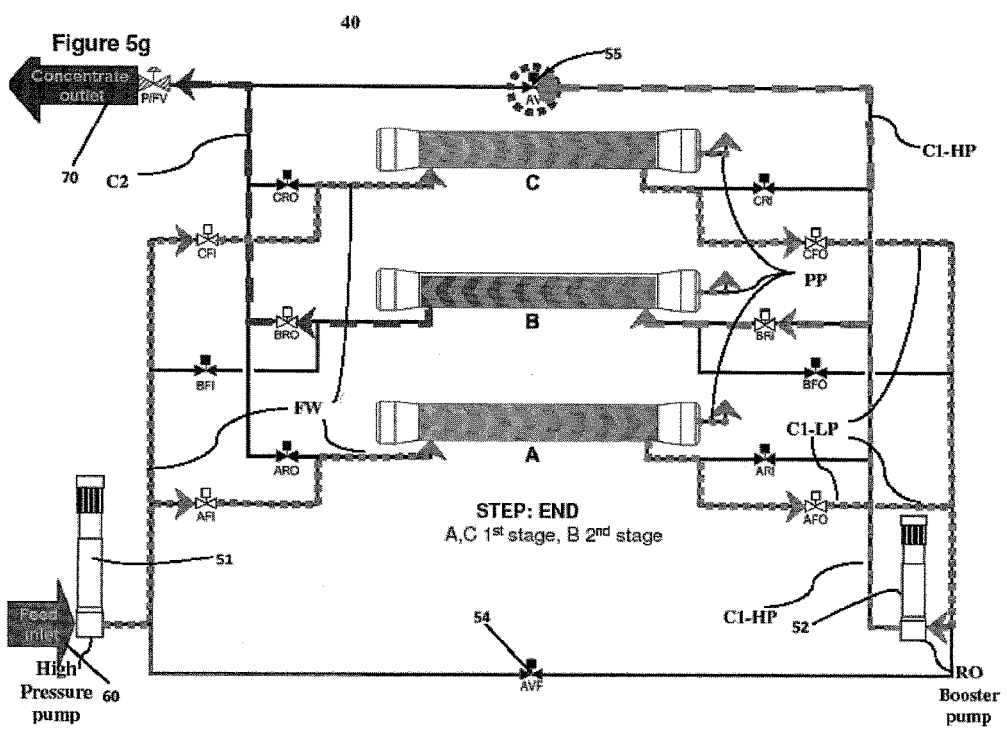

Thus in FIG. 5A, block C is in the third stage and blocks A and B are in the first stage. In FIG. 5G, block B is in the second stage and blocks A and C are in the first stage.

The following table clarifies the switching procedure step by step.

TABLE 1

Valve steps in moving from configuration with blocks A and B in stage I to blocks A and C in stage I (switching blocks B and C between stages), as illustrated in FIGS. 5A to 5G.

| | | STEPS | | | | | | |
|---|---|---|---|---|---|---|---|---|
| | Valves | Start (FIG. 5A) A,B $1^{st}$ stage C $2^{nd}$ stage | I (FIG. 5B) C slowed | Ii (FIG. 5C) C stopped | Iii (FIG. 5D) Stage 1 slowed | Iv (FIG. 5E) B stopped, C forward | V (FIG. 5F) B slowed, C forward | End (FIG. 5G) A,C $1^{st}$ stage, B $2^{nd}$ stage |
| BLOCK A | AFI | On | On | On | On | On | On | On |
| | AFO | On | On | On | On | On | On | On |
| | ARI | Off | Off | Off | Off | Off | Off | Off |
| | ARO | Off | Off | Off | Off | Off | Off | Off |
| BLOCK B | BFI | On | On | On | On | Off | Off | Off |
| | BFO | On | On | On | On | Off | Off | Off |
| | BRI | Off | Off | Off | Off | Off | On | On |
| | BRO | Off | Off | Off | Off | Off | On | On |
| BLOCK C | CFI | Off | Off | Off | Off | On | On | On |
| | CFO | Off | Off | Off | Off | On | On | On |
| | CRI | On | On | Off | Off | Off | Off | Off |
| | CRO | On | On | Off | Off | Off | Off | Off |
| Auxiliary Bypass Valves | AVF | Off | Off | Off | On | On | Off | Off |
| | AV | Off | On | On | On | On | On | Off |
| Comments | | A,B in $1^{st}$ stage C, in $2^{nd}$ stage | C slowed | C stopped | Stage I Slowed | B stopped C forward slow | B rev., slow C for., fast | A,C $1^{st}$ stage B, $2^{nd}$ stage |

The following items indicated in FIGS. 5A-5G refer to:
FW—Feed Water
C1-LP—Low Pressure Concentrate 1st stage
C1-HP—High Pressure Concentrate 1st stage
C1—1st stage Concentrate
C2—$2^{nd}$ stage
PP—Permeate Product

TABLE 2

Alternate way to switch blocks B and C between stages I and II eliminating need of valve AVF

| | | | | | STEPS | | | |
|---|---|---|---|---|---|---|---|---|
| | Valves | Start | I | ii | Iii | Iv | v | End |
| BLOCK A | AFI | On | On | On | On | On | On | On |
| | AFO | On | On | On | On | On | On | On |
| | ARI | Off | Off | Off | Off | Off | Off | Off |
| | ARO | Off | Off | Off | Off | Off | Off | Off |
| BLOCK B | BFI | On | On | On | On | Off | Off | Off |
| | BFO | On | On | On | On | Off | Off | Off |
| | BRI | Off | Off | Off | Off | Off | On | On |
| | BRO | Off | Off | Off | Off | Off | On | On |
| BLOCK C | CFI | Off | Off | Off | On | On | On | On |
| | CFO | Off | Off | Off | On | On | On | On |
| | CRI | On | On | Off | Off | Off | Off | Off |
| | CRO | On | On | Off | Off | Off | Off | Off |
| Auxiliary | AVF | Off | Off | Off | Off | Off | Off | Off |
| Bypass Valves | AV | Off | On | On | On | On | On | Off |
| Comments | | A,B $1^{st}$ stage C, $2^{nd}$ stage | C slowed | C stopped | All blocks on stage I and slow | B Stopped A,C For. Fast | B Rev., slow | A,C $1^{st}$ B, $2^{nd}$ st |

According to another embodiment of the present invention, the tapered flow desalination system and method are as follows. The system comprises three stages in which the concentrate exiting one stage becomes the feed entering the next stage. The system comprises K membrane block pressure vessels having feed water pass through them during the first stage, L membrane block pressure vessels having feed (concentrate exiting the K first stage blocks) pass through them during the second stage and M membrane block pressure vessels having feed (concentrate exiting the L second stage blocks) pass through them during the third stage, wherein preferably K>L>M. A booster pump is preferably connected to the flow lines at a portion of the line wherein the incoming feed at each stage flows through a single line before being split into the lines of the blocks of the next stage. The flow direction in block(s) of the third stage can be reversed and become part of the first stage and the flow direction in block(s) of the first stage can be reversed and become part of the third stage.

Additional elements (e.g. valves or control elements such as check valves or sensors) are connected to the system in a similar manner as explained hereinabove regarding the 2 stage embodiment. Each pressure vessel is coupled to a permeate product line wherein the permeate filtered exits the pressure vessel through it. The permeate product lines coming out of the pressure vessels are coupled to one main system outlet permeate product line.

According to an embodiment, the AV line (with the AV valve) couples between the concentrate outlet of the system and the third stage booster pump, in a similar manner as explained hereinabove regarding the 2 stage booster pump. Optionally, the AVF line (with the AVF valve) couples between the first stage booster pump and the second stage booster pump, as explained hereinabove regarding the second stage embodiment.

FIG. 7A-7F show an embodiment with six vessel blocks in the first stage (B, C and four more), three vessel blocks in the second stage and one vessel block (A) in the third stage. The system valves are connected to the system in a similar manner as in FIGS. 4-5.

The first booster pump is connected to the system incoming feed line 60.

The valves AFI, BFI and CFI are each coupled by flow lines to the first booster pump 51, to the valves ARO, BRO and CRO respectively, to the inlets/outlets of blocks A, B and C respectively, to the inlet of the four additional first stage blocks and to one another.

The valves ARO, BRO and CRO are also coupled to the inlets/outlets of each of the blocks A, B and C respectively, to the AV valve 55, to the system outlet concentrate outlet line 70 (of the system) and to one another.

The valves AFO, BFO and CFO are each coupled by flow lines to the second booster pump 52, to the valves ARI, BRI and CRI respectively, to the inlets/outlets of blocks A, B and C respectively, to the outlets of the four additional first stage blocks and to one another.

The valves ARI, BRI and CRI are also coupled to the inlets/outlets of blocks A, B and C respectively, to the third booster pump 53, to the AV valve 55 and to one another.

The second booster pump 52 is also coupled to the outlets of the four additional first stage blocks and to the inlets of the three second stage blocks.

The third booster pump 53 is also coupled to the outlets of the three second stage blocks and to the AV valve 55.

The AV valve 55 is also coupled to the concentrate outlet line 70 of the system.

Each pressure vessel is coupled to a permeate product line wherein the permeate filtered exits the pressure vessel through it. The permeate product lines coming out of the pressure vessels are coupled to one main system outlet permeate product line 80.

The method of this embodiment comprises switching roles between two pressure vessel blocks, one in the first stage and the other in the third stage. Thus the third stage block which is most exposed to scaling/membrane fouling because the feed entering it is highly concentrated (supersaturated) after passing two vessel blocks (of the first stage and second stage). Therefore this method of switching is a very efficient because after switching, the former third stage vessel is exposed to under saturated feed water which washes out all the minerals and materials that accumulated on the former third stage vessel, and this is done without water hammering.

The initial working mode is wherein at a first stage incoming feed water is passed through blocks C, B and through 4 additional blocks. The concentrated liquid coming out of those four blocks is passed in the second stage through three blocks. The concentrated liquid coming out of those three blocks is passed in the third stage though block A, and from there out of the system. The method comprises switching the roles between block A and block B. After the switching, block A is connected to the feed line 60 (at its opposite side), and block B becomes the third stage vessel block. This is done by opening/closing the appropriate valves. In this example a further switch can be made in which block C becomes the third stage vessel block and the vessel blocks A and B are part of the 6 blocks of vessels in the first stage. The working modes are switched periodically. Alternatively there can be only blocks A and B which are switched between the first and third stages, without any block C being connected to a manifold for switching as described in the previous paragraph.

Figure 7A:
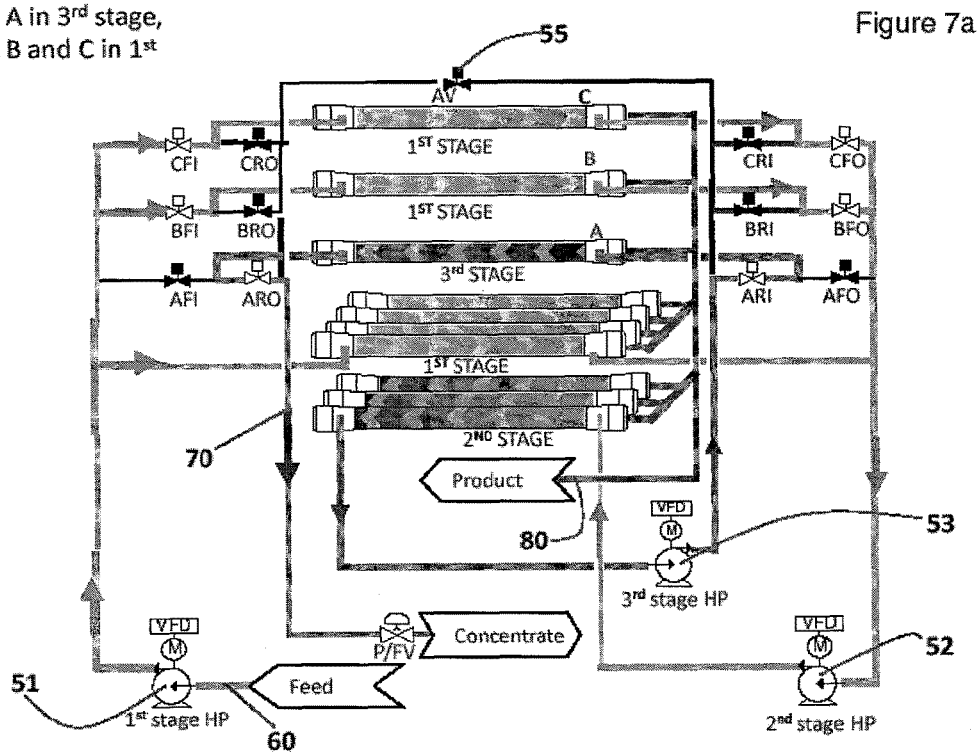
Figure 7C:
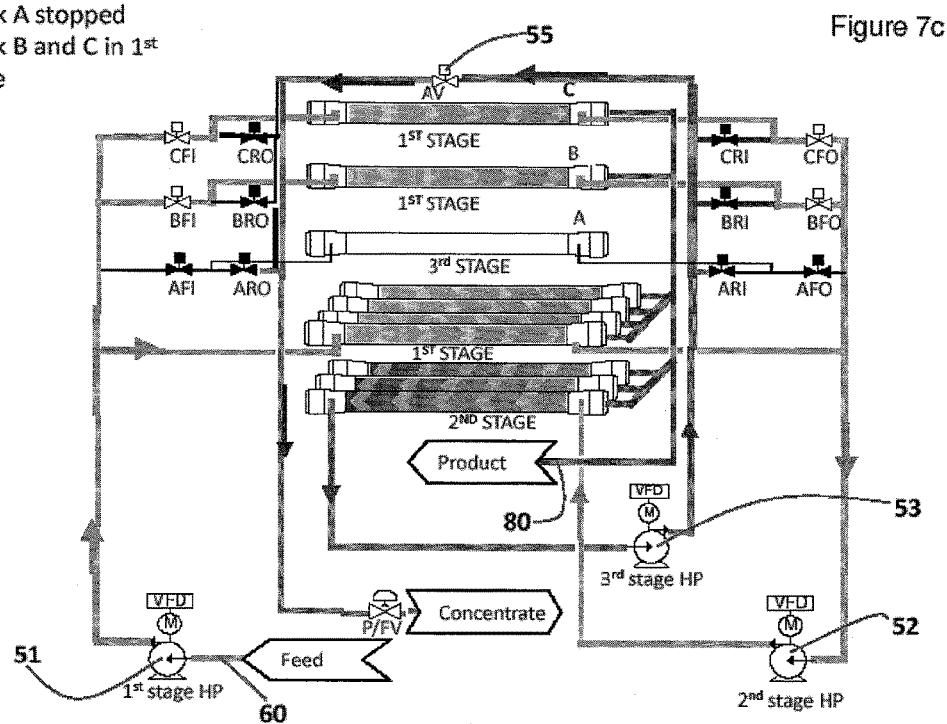

The blocks of pressure vessels A, B, and C have been connected to the flow manifold so that they can either operate in parallel and as part of the first stage or as part of the third stage. When the valves connected to a block and labeled with the symbol FI and FO are open (open symbols) then that block is parallel to and part of the first stage. When the valves connect to a block and labeled with the symbols RI and RO are open (open symbols) then that block is part of the third stage. Thus in FIG. 7A, block A is in the third stage and blocks B and C are in the first stage. In FIG. 7F, block B is in the third stage and blocks A and C are in the first stage parallel to the rest of the pressure vessels in the first stage. This arrangement has the advantage that because the blocks are being switched into and out of the first and last stage, the change in the number of pressure vessels in parallel in the first stage during the switching is relatively minor and this minimizes any hydraulic upset. The steps described hereinabove that are used in switching between the first and second stage, are similar to those taken here as well to minimize any hydraulic shocks.

The following table clarifies the switching procedure step by step.

TABLE 3

Valve steps in moving from configuration with block A in stage III (while blocks B and C are together with rest of stage I) to block B in stage III (while blocks A and C are together with rest of stage I), as illustrated in FIGS. 7A to 7F. (C does not change stages)

| | | STEPS | | | | | |
|---|---|---|---|---|---|---|---|
| | Valves | Start (I) (FIG. 6A) | II (FIG. 6B) | III (FIG. 6C) | IV (FIG. 6D) | V (FIG. 6E) | End (VI) (FIG. 6F) |
| BLOCK A | AFI | Off | Off | Off | On | On | On |
| | AFO | Off | Off | Off | On | On | On |
| | ARI | On | On | Off | Off | Off | Off |
| | ARO | On | On | Off | Off | Off | Off |
| BLOCK B | BFI | On | On | On | Off | Off | Off |
| | BFO | On | On | On | Off | Off | Off |
| | BRI | Off | Off | Off | Off | On | On |
| | BRO | Off | Off | Off | Off | On | On |
| BLOCK C | CFI | On | On | On | On | On | On |
| | CFO | On | On | On | On | On | On |
| | CRI | Off | Off | Off | Off | Off | Off |
| | CRO | Off | Off | Off | Off | Off | Off |
| Bypass Valves | AV | Off | On | On | On | On | Off |
| Comments | | B,C $1^{st}$ stage A $3^{rd}$ stage | A slowed | A stopped | A in $1^{st}$ stage and B stopped | B reversed in $3^{rd}$ stage and slow A, C $1^{st}$ stage fast | B in $3^{rd}$ stage and regular speed A, C $1^{st}$ stage fast |

While some of the embodiments of the invention have been described by way of illustration, it will be apparent that the invention can be carried into practice with many modifications, variations and adaptations, and with the use of numerous equivalents or alternative solutions that are within the scope of a person skilled in the art, without departing from the spirit of the invention, or the scope of the claims.

The invention claimed is:

1. A tapered flow desalination system comprising:
   a system inlet feed line coupled to a first high pressure booster pump configured to provide a high pressure feed stream to the system, wherein said first high pressure booster pump comprises an inlet and an outlet;
   blocks of membrane pressure vessels arrayed in parallel, wherein the outlet of said first high pressure booster pump is coupled by means of flow lines to said blocks at first opening sides of said blocks;
   a second high pressure booster pump, comprising an inlet and an outlet, coupled at said second high pressure booster pump inlet by a first bypass line parallel to said blocks, to said first high pressure booster pump outlet, wherein said second high pressure booster pump outlet and inlet are also coupled by means of flow lines to said blocks at second opening sides of said blocks and wherein said first bypass line is also coupled by means of flow lines to said blocks at said second opening sides of said blocks;

a system outlet flow line coupled to said first opening sides of said blocks by means of flow lines and coupled to said second opening sides of said blocks and to the second high pressure booster pump outlet, wherein said system outlet flow line is coupled to said second opening sides of said blocks and to said second high pressure booster pump outlet by means of a second bypass line;

wherein the first bypass line comprises a valve and wherein the second bypass line comprises a valve;

wherein at least two of the flow lines coupling between said first high pressure booster pump outlet and said first opening sides of said blocks each comprise a valve;

wherein at least two of the flow lines coupling between said second high pressure booster pump outlet and said second opening sides of said blocks each comprise a valve;

wherein at least two of the flow lines coupling between said second opening sides of said blocks and said second high pressure booster pump inlet each comprise a valve;

wherein at least two of the flow lines coupling between said first opening sides of said blocks and said system outlet flow line each comprise a valve; and wherein said first bypass line is configured to bypass excess flow from said first high pressure booster pump outlet to the second high pressure booster pump inlet without changing said excess flow composition within said first bypass line.

2. The system according to claim 1, wherein said system comprises three blocks, and wherein the flow lines coupling between said first high pressure booster pump and said first opening sides of said blocks each comprise a valve;

wherein the flow lines coupling between said second high pressure booster pump and said second opening sides of said blocks each comprise a valve;

wherein the flow lines coupling between said second opening sides of said blocks and said first bypass line each comprise a valve; and wherein the flow lines coupling between said first opening sides of said blocks and said system outlet flow line each comprise a valve.

3. The system according to claim 1, wherein the system comprises one or more control elements selected from the group consisting of additional valves, check valves and sensors.

4. The system according to claim 1, wherein each of the blocks of membrane pressure vessels is coupled to a permeate product line.

\* \* \* \* \*

UNITED STATES PATENT AND TRADEMARK OFFICE
CERTIFICATE OF CORRECTION

PATENT NO. : 10,245,556 B2  
APPLICATION NO. : 14/394519  
DATED : April 2, 2019  
INVENTOR(S) : Jack Gilron et al.

Page 1 of 1

It is certified that error appears in the above-identified patent and that said Letters Patent is hereby corrected as shown below:

On the Title Page

Please delete item (71) Applicant, and replace with the following:
--(71) Applicant: BEN GURION UNIVERSITY OF THE NEGEV RESEARCH AND DEVELOPMENT AUTHORITY, Beer-Sheva (IL); MEKOROT WATER COMPANY LTD., Tel Aviv (IL)--.

Signed and Sealed this  
Twenty-first Day of May, 2019

Andrei Iancu  
*Director of the United States Patent and Trademark Office*